US012763494B2

(12) United States Patent
Chen et al.

(10) Patent No.: US 12,763,494 B2
(45) Date of Patent: Oct. 13, 2026

(54) ANTENNA INCORPORATION WITHIN A DEVICE HAVING A NARROW DISPLAY BEZEL

(71) Applicant: Google LLC, Mountain View, CA (US)

(72) Inventors: Huanyu Chen, Fremont, CA (US); Brian Huynh, San Jose, CA (US)

(73) Assignee: Google LLC, Mountain View, CA (US)

( * ) Notice: Subject to any disclaimer, the term of this patent is extended or adjusted under 35 U.S.C. 154(b) by 175 days.

(21) Appl. No.: 18/743,941

(22) Filed: Jun. 14, 2024

(65) Prior Publication Data

US 2024/0421503 A1 Dec. 19, 2024

Related U.S. Application Data

(60) Provisional application No. 63/508,610, filed on Jun. 16, 2023.

(51) Int. Cl.

| | |
|---|---|
| ***H01Q 13/18*** | (2006.01) |
| ***H01Q 1/24*** | (2006.01) |
| ***H01Q 21/28*** | (2006.01) |

(52) U.S. Cl.

CPC .......... *H01Q 21/28* (2013.01); *H01Q 1/241* (2013.01); *H01Q 13/18* (2013.01)

(58) Field of Classification Search

CPC .......... H01Q 1/24; H01Q 1/241; H01Q 1/243; H01Q 1/48; H01Q 1/52; H01Q 1/521; H01Q 5/00; H01Q 13/00; H01Q 13/10; H01Q 13/18; H01Q 21/28; H01Q 21/30

See application file for complete search history.

(56) References Cited

U.S. PATENT DOCUMENTS

| | | | | |
|---|---|---|---|---|
| 10,847,901 B1 | 11/2020 | Ayala Vazquez et al. | | |
| 11,201,385 B2 | 12/2021 | Oh et al. | | |
| 11,309,628 B2 | 4/2022 | Ayala Vazquez et al. | | |
| 11,749,876 B2 * | 9/2023 | Zheng | H01Q 5/22 343/702 | |
| 2021/0091477 A1 * | 3/2021 | Yue | H01Q 13/10 | |

(Continued)

FOREIGN PATENT DOCUMENTS

| | | |
|---|---|---|
| CN | 105140623 B | 3/2018 |
| CN | 105720355 B | 5/2019 |
| WO | 2018219112 A1 | 12/2018 |

OTHER PUBLICATIONS

Shu-Chuan Chen et al., "Compact Sub 6 GHz Slot Multiantenna System for 5G Laptops," *Micromachines* 2023, 14, 626. https://doi.org/10.3390/mi14030626 16 pages.

*Primary Examiner* — Thai Pham
(74) *Attorney, Agent, or Firm* — Lerner David LLP

(57) ABSTRACT

Various arrangements for positioning antennas, grounds, and a decoupling element are described herein. A display is mounted within a first area of an enclosure of the electronic device. A first antenna and second antenna that operate at one or more frequency bands are mounted within the enclosure. A decoupling element is mounted within a cavity area of the enclosure that, at least partially, isolates the first antenna from the second antenna, wherein a position of the decoupling element defines a common edge of a first cavity area that includes the first antenna and a second cavity area that includes the second antenna, and a first length of the decoupling element is less than a second length of the common edge.

17 Claims, 9 Drawing Sheets

(56) References Cited

U.S. PATENT DOCUMENTS

| | | | | |
|---|---|---|---|---|
| 2023/0083466 | A1 | 3/2023 | Li et al. | |
| 2023/0141980 | A1 * | 5/2023 | Tsai | H01Q 5/378<br>343/893 |

* cited by examiner

ANTENNA INCORPORATION WITHIN A DEVICE HAVING A NARROW DISPLAY BEZEL

CROSS REFERENCES TO RELATED APPLICATIONS

This application claims priority to U.S. Provisional Patent Application No. 63/508,610 entitled "Antenna Incorporation within a Device having a Narrow Display Bezel," filed on Jun. 16, 2023, the entire disclosure of which is hereby incorporated by reference for all purposes.

BACKGROUND

Electronic devices, such as tablet computing devices and mobile phones, include one or more antennas for use in wireless communication. For example, the electronic devices may include functionality to communicate using one or more WiFi bands (e.g., 2.4 GHz, 5 GHZ). It can be difficult, however, to incorporate antennas in today's electronic devices. Many electronic devices have metal structures with limited space to place the antennas. Further, degradation of the performance and efficiency of the antennas may result from proximity of the antennas to certain components (e.g., battery, metal plate), which can interfere with the electric signals on the antennas. Still yet, some electronic devices may have metal enclosures, without an antenna window, that can significantly degrade antenna signals.

SUMMARY

Various embodiments for antenna incorporation within an electronic device are described herein. Using techniques described herein, the performance and efficiency of antennas placed in close proximity to each other within an electronic device having a narrow display bezel can be improved compared to prior techniques.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an electronic device. According to some examples, the electronic device also includes an enclosure. According to some examples, the device also includes a display mounted on top of the enclosure. According to some examples, the device also includes a first antenna mounted within the enclosure, where the first antenna operates at one or more first frequency bands. According to some examples, the device also includes a second antenna mounted within the enclosure, where the second antenna operates at one or more second frequency bands. According to some examples, the device also includes a decoupling element mounted within a cavity area of the enclosure that, at least partially, isolates the first antenna from the second antenna, where a position of the decoupling element defines a common edge of a first cavity area that includes the first antenna and a second cavity area that includes the second antenna, and a first length of the decoupling element is less than a second length of the common edge. Other embodiments of this aspect include corresponding computer systems, apparatus, and computer programs recorded on one or more computer storage devices, each configured to perform the actions of the methods.

Implementations may include one or more of the following features. The electronic device where the enclosure is a metal enclosure that is absent of an antenna window. The first antenna and the second antenna are mounted beneath a display bezel. The display bezel is less than 10 mm wide, and where the first antenna is mounted near a first corner of the enclosure and the second antenna is mounted near a second corner of the enclosure. The grounding elements are positioned to ground the display and are positioned within the enclosure based, at least in part, on at first location of the first antenna, or a second location of the second antenna. The one or more grounding elements are further positioned based on a determination of a first strength of a first current of the first antenna at the first location within the electronic device and a second strength of a second current of the second antenna at the second location within the electronic device. The one or more grounding elements may include one or more of a fabric over foams (FoF), a spring, or a screw. The decoupling element is positioned beneath the display and between the first antenna and the second antenna based, at least in part, on one or more antenna isolation measurements. The first antenna and the second antenna are slot antennas. Implementations of the described techniques may include hardware, a method or process, or computer software on a computer-accessible medium.

One general aspect includes a system. According to some examples, the system also includes an electronic device that includes a metal enclosure. According to some examples, the system also includes a display mounted on the metal enclosure of the electronic device. According to some examples, the system also includes a first antenna mounted within a first area of the electronic device, where the first antenna operates at one or more of a 2.4 GHz frequency band and a 5 GHz frequency band. According to some examples, the system also includes a second antenna mounted within the first area of the electronic device, where the first antenna operates at one or more of a 2.4 GHz frequency band and a 5 GHz frequency band. According to some examples, the system also includes a decoupling element mounted within the first area of the metal enclosure that, at least partially, isolates the first antenna from the second antenna, where a position of the decoupling element defines a common edge of a first cavity area that includes the first antenna and a second cavity area that includes the second antenna, and a first length of the decoupling element is less than a second length of the common edge. Other embodiments of this aspect include corresponding computer systems, apparatus, and computer programs recorded on one or more computer storage devices, each configured to perform the actions of the methods.

Implementations may include one or more of the following features. The system where the enclosure is absent of an antenna window. The first antenna and the second antenna are mounted beneath the display bezel. The grounding elements are positioned to ground the display and are positioned within the metal enclosure based, at least in part, on at first location of the first antenna, or a second location of the second antenna. The one or more grounding elements are further positioned based on a determination of a first strength of a first current of the first antenna at the first location within the electronic device and a second strength of a second current of the second antenna at the second location within the electronic device. The one or more grounding elements may include one or more of a fabric over foams (FoF), a spring, or a screw. The decoupling element is positioned beneath the display and between the first antenna and the second antenna based, at least in part, on one or more antenna isolation measurements. The first antenna and the second antenna are slot antennas. Implementations of the described techniques may include hardware, a method or process, or computer software on a computer-accessible medium.

One general aspect includes a method for incorporating antennas within an electronic device. According to some examples, the method also includes determining a first location to mount a first antenna within an enclosure of the electronic device. According to some examples, the method also includes determining a second location to mount a second antenna within the enclosure. According to some examples, the method also includes determining a third location to mount a decoupling element within the enclosure, where the decoupling element at least partially isolates the first antenna from the second antenna by defining a common edge of a first cavity area that includes the first antenna and a second cavity area that includes the second antenna, and a first length of the decoupling element is less than a second length of the common edge. According to some examples, the method also includes mounting the first antenna, the second antenna, and the decoupling element within the enclosure. Other embodiments of this aspect include corresponding computer systems, apparatus, and computer programs recorded on one or more computer storage devices, each configured to perform the actions of the methods.

Implementations may include one or more of the following features. The method may include determining grounding locations to mount one or more grounding elements within the enclosure, where the determining is, based at least in part on the first location of the first antenna and the second location of the second antenna. Determining the grounding locations is further based on a determination of a first strength of a first current of the first antenna at the first location within the electronic device and a second strength of a second current of the second antenna at the second location within the electronic device. Implementations of the described techniques may include hardware, a method or process, or computer software on a computer-accessible medium.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
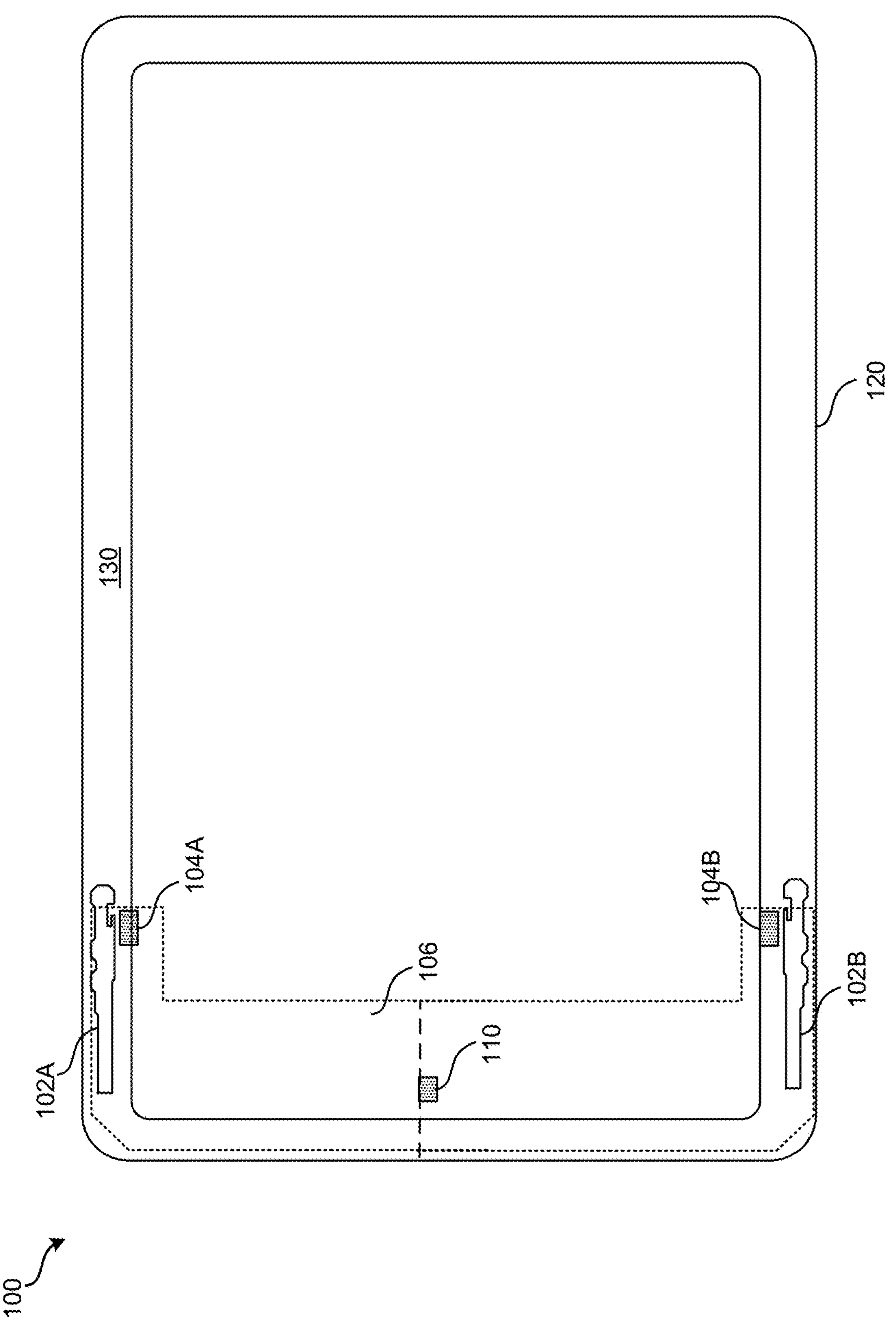
FIG. 1 illustrates a top view of an electronic device that includes antennas.

As briefly described above, many electronic devices (e.g., tablets, phones, gaming devices, televisions, monitors, . . . ) include limited space to mount antennas as well as having other features (e.g., metal enclosures, narrow bezels, no antenna window, . . . ) that can negatively impact the performance of antennas. Using techniques described herein, the performance and efficiency of antennas can be improved using low-cost solutions that are adaptable to a large number of electronic devices.

In some configurations, antennas can be mounted underneath a narrow bezel (e.g., less than 10 mm, 12 mm, . . . ) near an edge of the device. According to some examples, a first antenna is mounted underneath the bezel near a first corner of the electronic device, and a second antenna is located underneath a bezel near a second corner of the electronic device. Mounting the antennas underneath the bezel and near the edge of the device can help improve the performance of the antennas due to the radiation of the antenna signals to the ambient environment outside of the enclosure.

According to some configurations, placement of one or more grounding elements in proximity to the antennas can be based on a determination that identifies the location near each of the antennas where the current associated with a particular frequency band is the strongest. For example, a determination using testing and/or simulating of an antenna can be made to identify a possible location of one or more grounding elements (e.g., grounding foam, spring, . . . ) to increase the efficiency of the antenna. This determination can be made for each of the other antennas included within the electronic device. Generally, the grounding elements are placed within the enclosure to improve the performance of the antennas such that the antennas radiate primarily to the ambient environment outside of the enclosure rather than radiating into the space within the enclosure.

Using techniques described herein, a decoupling element is placed within the enclosure that is between the first antenna and the second antenna. The decoupling element may be a grounding element (e.g., grounding foam, spring) that is directed at isolating the first antenna within a first from the second antenna. In some examples, the decoupling element is positioned within a cavity area of the enclosure that includes both the first antenna and the second antenna. In contrast to prior solutions, the decoupling element does not need to extend across the entire cavity area to isolate the different antennas. Instead, the decoupling element may cover/extend only over a small portion (e.g., 5%, 10%, . . . ) of the cavity area to create a first cavity area for the first antenna, and a second antenna for the second antenna. According to some examples, the decoupling element is an off-the-shelf element such as but not limited to one or more fabric over foams (FoF), springs, or screws. Using an off-the-shelf element as decoupling element can result in significant cost savings as compared to creating a custom machined solution or using some other more expensive decoupling element.

In some examples, the size and/or location of the decoupling element can be based on a determination that identifies the location near the antenna(s) where the current associated with a particular frequency band is the strongest. For example, testing and/or simulating can be made to determine a ratio between the power incident upon the first antenna and the power delivered to the second antenna to identify a possible location and size of one or more decoupling elements to increase the isolation of the antennas. Generally, the decoupling element 110 is placed near the middle of the cavity area and at least partially isolates the first antenna from the second antenna such that the interference between the first antenna and the second antenna is reduced as compared to not including a decoupling element to form the different cavity areas that include an antenna. The use of a smaller decoupling element is a very low-cost solution, as compared to having to machine the enclosure to divide the cavity area, and/or use more costly larger grounding elements. Placing a smaller decoupling element is also easier since there may be many other components that are located near the decoupling element.

FIG. 1 illustrates a top view 100 of an electronic device 120 that includes antennas. In some examples, the electronic device 120 may be a tablet, a phone, a gaming device, a television, a monitor, or some other device that includes antennas, such as slot antennas. As illustrated, the electronic device 120 includes two antennas, a first antenna 102A and a second antenna 102B. In the current example, the first antenna 102A and the second antenna 102B are multiple band antennas that emit radiation from the enclosure. According to some configurations, the electronic device 120 has a metal enclosure that does not include an antenna window. As used herein, the term "metal enclosure" refers to the bottom portion of an electronic device that is all metal and extends to where the display module is mounted on top of the enclosure. In some cases, the back of the display (not seen by the user) may be primarily metal.

As illustrated, the electronic device 120 includes two antennas that can operate at multiple bands (e.g., 2.4 GHz, 5 GHZ, 6 GHz bands). The antennas 102, such as the first antenna 102A and the second antenna 102B, however, may include any suitable structure that enables single or multi-band functionality. While two antennas are illustrated, more or fewer antennas may be included in other examples.

The electronic device 120, as illustrated, includes grounding elements, such as grounding foam 104A used for grounding the display (See 204 of FIG. 2) located proximate to first antenna 102A and display grounding foam 104B located proximate to second antenna 102B. Generally, slot antennas are grounded to floating metals at different grounding positions to improve antenna efficiencies. Generally, conductive fabric over foams (FoF), or spring contacts are placed near the antenna, or even surrounding the whole antenna, to help ensure that FoFs and springs provide efficient grounding conditions.

In many cases, the location where antennas are located, as well as other components, such as grounding elements, within the enclosure of the electronic device 120 is limited. The placement of the grounding foams 104 can also affect the performance of the antennas. Placement of the grounding foams 104 need sufficient space and height within the electronic device 120. In some cases, to prevent the grounding foams 104 from applying to much force on the ICs and to limit the force applied to the display module, one or more grounding foams 104 may be limited in size and placed farther away from the antennas than desired. Placing the grounding foam 104 farther away from the antenna 102 can result in the energy from the antenna 102 to radiate to other directions in the enclosure rather than radiating into the ambient environment.

According to some configurations, testing and/or simulating can be used to determine the placement of the grounding foams. In some examples, the testing and/or simulating includes identifying the location near each of the antennas where the current associated with a particular frequency band is the strongest. Generally, the grounding elements are placed within the enclosure to improve the performance of the antennas such that the antennas radiate primarily to the ambient environment outside of the enclosure rather than radiating into the space within the enclosure Further, the antennas 102 within the enclosure can interfere with each other. Using techniques described herein, a decoupling element 110 is placed within the enclosure in a space between the first antenna 102A and the second antenna 102B. The decoupling element 110 is directed at isolating the antennas 102 and thereby increasing the efficiency of the antennas 102 when they are placed in proximity to each other.

In some configurations, the antenna system illustrated includes two antennas 102 positioned proximate to the same side of an electronic device 120 underneath a display bezel 130, which may be referred to herein as "bezel 130" and that includes the decoupling element 110 (e.g., decoupling conductive foam) that is placed in the space between the two antennas. Using the antenna system described herein, an electronic device 120 having a metal enclosure can utilize two antennas in close proximity to each other at an increased efficiency and performance as compared to prior techniques for incorporating antennas into an electronic device.

In some examples, one or more decoupling elements 110 are positioned between different antennas 102 that are mounted within the enclosure. According to some configurations, a conductive foam is used as the decoupling element to decouple/isolate the different antennas 102. In other examples, the decoupling element 110 may be a metal spring clip, and/or some other material could that is directed at isolating the antennas. In some examples, the decoupling element can be compressed when the display component is placed on top of the decoupling element 110.

Figure 3:
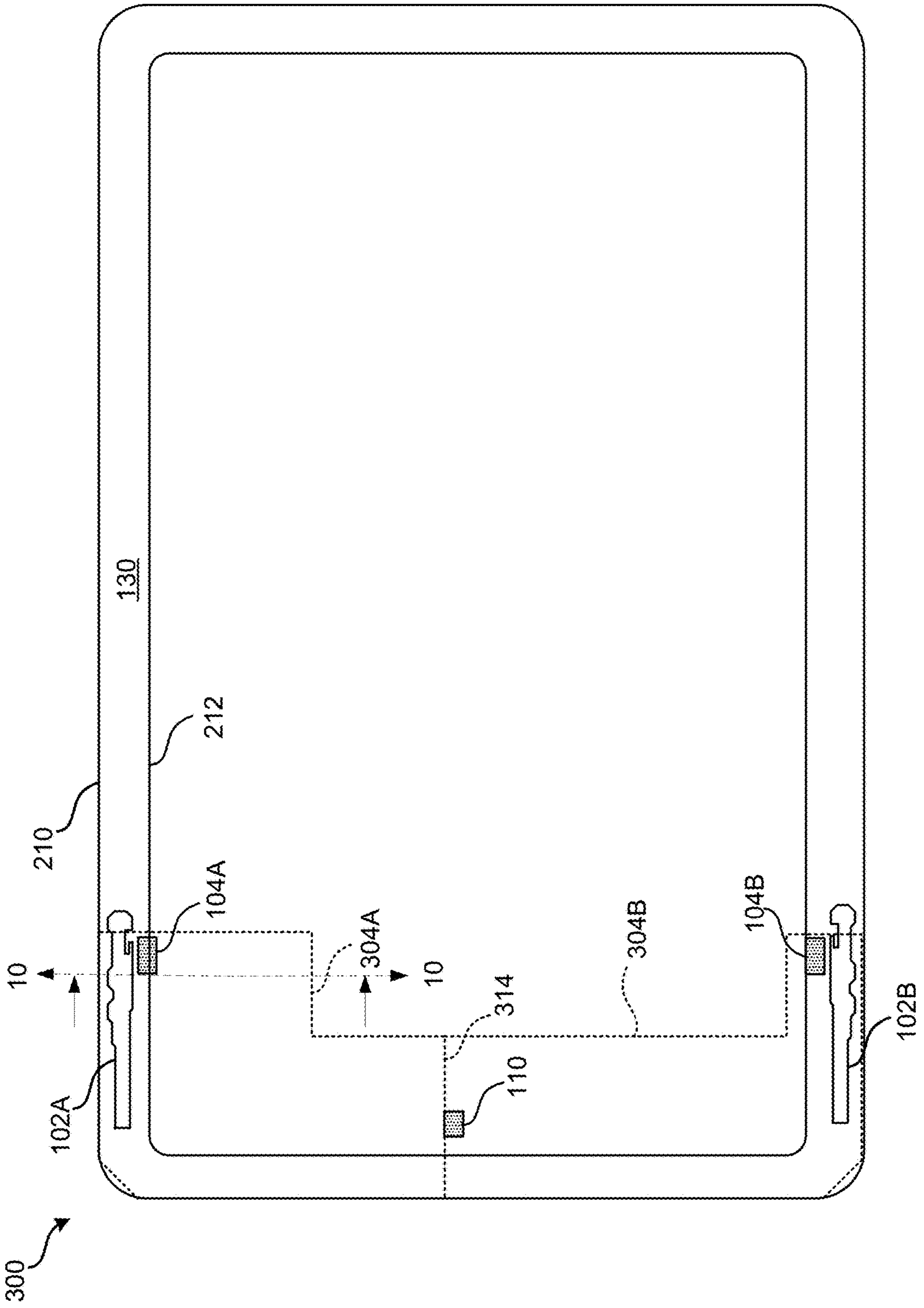
FIG. 3 illustrates a top view of an electronic device that includes two antennas.

As illustrated, decoupling element 110 is positioned within an area 106 such that two different areas are formed (See FIG. 3 and related discussion). The decoupling element 110 assists in isolating the different antennas, such as first antenna 102A and second antenna 102B.

Antenna isolation is a measure of a ratio between the power incident upon a first antenna and the power delivered to a second antenna. Good isolation, therefore, results in uncorrelated transmission and reception of electric signals on both antennas. Poor isolation between antennas can significantly reduce performance and efficiency of the antennas. As illustrated, antennas can be incorporated in an electronic device 120, as well as other devices that have metal enclosures and/or other materials that can impact antenna operation. Using the antenna system described herein, an electronic device having a full metal enclosure can utilize two antennas in close proximity to each other.

In the current example, the electronic device 120 includes a metal enclosure in which different components of the electronic device are located. As illustrated, a first antenna 102A is placed near a first top corner of the electronic device 120, and a second antenna 102B is placed near a second bottom corner of the electronic device. In the illustrated example, the second corner is the corner of the electronic device that is directly below the first corner. In other examples, the antennas 102 can be placed at other locations within the enclosure of the electronic device 120. As can be seen by referring to FIG. 1, there are different electrical components, such as first speaker, and a second speaker, placed within the cavity near the antennas.

Figure 2:
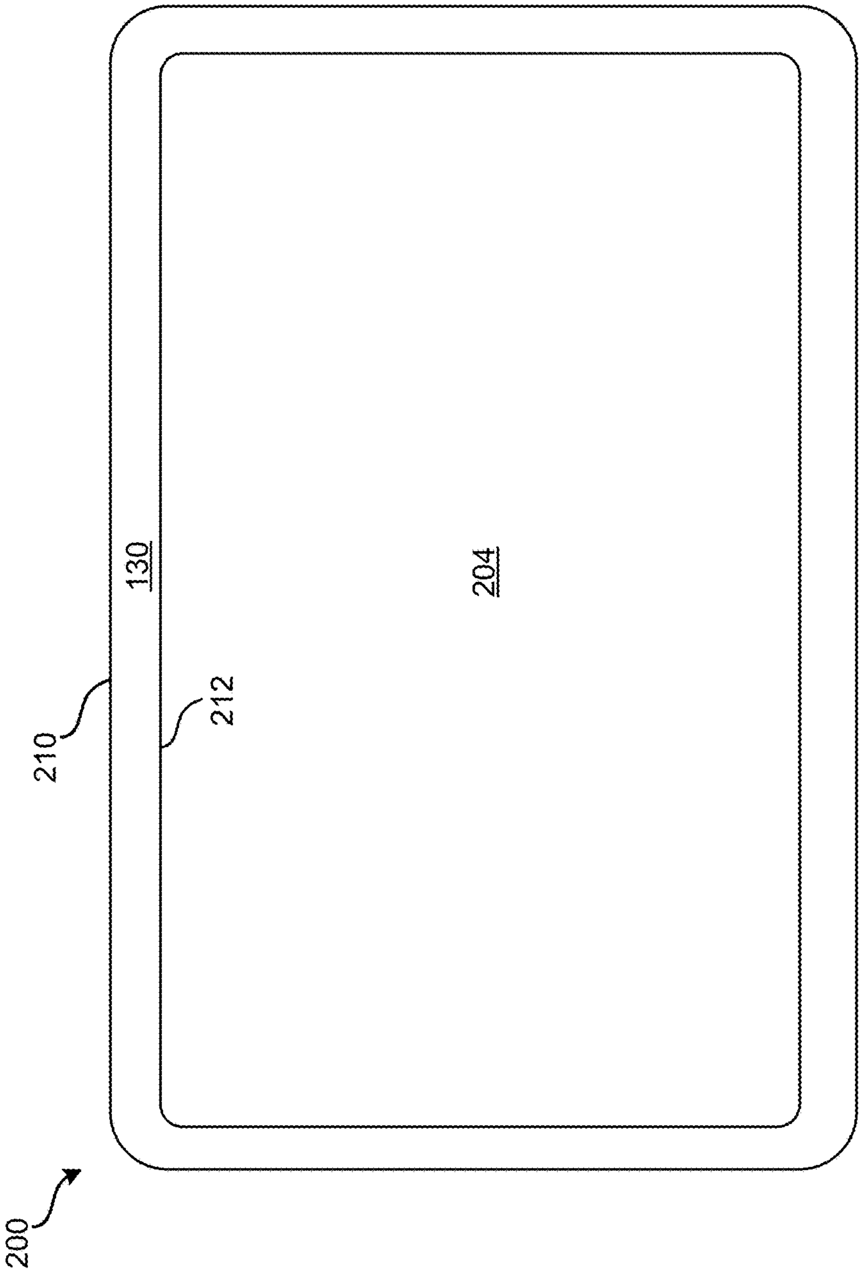
FIG. 2 illustrates a top view of an electronic device that has a narrow display bezel.

FIG. 2 illustrates a top view 200 of an electronic device that has a narrow display bezel 130. As illustrated, an electronic device, such as electronic device 120, has a display bezel 130 that surrounds the display 204. In the current example, the display bezel is a narrow width that is defined by outside line 210 (which can correspond to an edge of display bezel 130) and inside line 212 (e.g., less than 10 mm, 12 mm, . . . ), which can correspond to an edge of display 204. According to some configurations, the display 204 may be disposed on top of a metal enclosure that does not include an antenna window. The absence of an antenna window, in some cases, can result in decreased performance and efficiency of an antenna. Additionally, as discussed above, the performance and efficiency of antennas 102 can be degraded from proximity of the antennas to certain components (e.g., battery, metal plate), which can interfere with the electric signals on the antennas.

Using techniques described herein, the performance and efficiency of antennas mounted in close proximity to each other within a metal enclosure that does not include an antenna can be improved compared to prior solutions. By mounting the antennas underneath the bezel and measuring/simulating the antennas with grounding elements at different possible locations, the performance of the antennas improves such that the antennas radiate primarily to the ambient environment outside of the enclosure rather than radiating into the space within the enclosure. Further improving the performance of the antennas is the placement of the decoupling element between the two antennas to improve isolation. Instead of machining the enclosure to have separate cavity areas that are totally enclosed for each of the different antennas, a low-cost decoupling element such as grounding foam 104 may cover/extend only over a small portion (e.g., 5%, 10%, . . . ) of the cavity area to create isolation between the antennas.

FIG. 3 illustrates a top view 300 of an electronic device, such as electronic device 120, that includes two antennas 102. The top view 300 includes a section line 10-10, which corresponds to the sectional view in FIG. 6. In the illustrated example, the first antenna 102A is located beneath the display bezel 130 near a top corner of the electronic device 120 and the second antenna 102B is located beneath the display bezel 130 near a bottom corner of the electronic device 120.

As illustrated, the first antenna 102A is positioned within a first cavity area 304A that may/may not include other components (e.g., speakers, input/output ports, . . . ). The second antenna 102B is positioned within a cavity area 304B that may/may not include other components (e.g., speakers, input/output ports, . . . ). In some examples, the antennas are Multiple-In Multiple-Out (MIMO) wireless-fidelity antennas (e.g., 2×2 highly efficient MIMO triband antennas, Wi-Fi 2.4 GHz, 5 GHz, 6 GHZ) placed within open cavities formed between a display (e.g., narrow display bezel) and an enclosure (e.g., metal disclosure) of a user equipment (UE), such as a tablet) and no antenna window is visible on the surface of the UE. In other examples, different types of antennas can be used.

According to some examples, a decoupling element 110, such as but not limited to decoupling foam, is placed such that the two different cavity areas 304A and 304B are formed from a single cavity area (the area that includes cavity area 304A and cavity area 304B) such that the first antenna 102A is isolated from the second antenna 102B. Generally, the decoupling element 110 at least partially isolates the first antenna from the second antenna such that the interference between the first antenna and the second antenna is reduced as compared to not including a decoupling element 110 to form the different cavity areas. According to some examples, the decoupling element 110 is an off-the-shelf element such as but not limited to one or more fabric over foams (FoF), springs, or screws. Using an off-the-shelf element as decoupling element 110 can result in significant cost savings as compared to creating a custom machined solution or using some other more expensive decoupling element.

In contrast to incorporating a solid dividing wall into the element of the enclosure to form different cavity areas to include different antennas 102, the decoupling element (e.g., foam) saves costs, and can extend over just a portion (e.g., 5%-95%) of the dividing area (as indicated by element 314). Generally, the decoupling element 110 is placed near the center of the single cavity. According to some configurations, the dividing area may be based on positioning of other components within the single cavity area. For example, if there is not space to position the decoupling element 110 in the center of the single cavity area, then the decoupling element may be placed off center.

In some examples, the size and/or location of the decoupling element can be based on a determination that identifies the location near the antenna(s) where the current associated with a particular frequency band is the strongest. For example, testing and/or simulating can be made to determine a ratio between the power incident upon the first antenna and the power delivered to the second antenna to identify a possible location and size of one or more decoupling elements to increase the isolation of the antennas. In some examples, the decoupling element 110 may extend only over a small portion of the dividing area (e.g., 5%, 10%, 20%, . . . ). In other examples, the decoupling element 110 may extend over a larger portion of the dividing area (e.g., 50%, 60%, 90%). Stated another way, the two different cavity areas 304A and 304B are not completely physically separated from each other.

In some configurations, display grounding foam 104A can be placed near the first antenna 102A and display grounding foam 104B can be placed near the second antenna 102B. The display grounding foams 104A and 104B couple to a display (See FIG. 2) that covers the top of the electronic device. In other configurations, there may be more than two display grounding foams 104. According to some examples, the display grounding foam 104A and the display grounding foam 104B are located such that each antenna operates more efficiently as compared to if the display grounding foams were not located near the antenna. In other examples, as briefly discussed above, the display grounding foams may need to be positioned differently depending on constraints associated with the electronic device 120.

Figure 4:
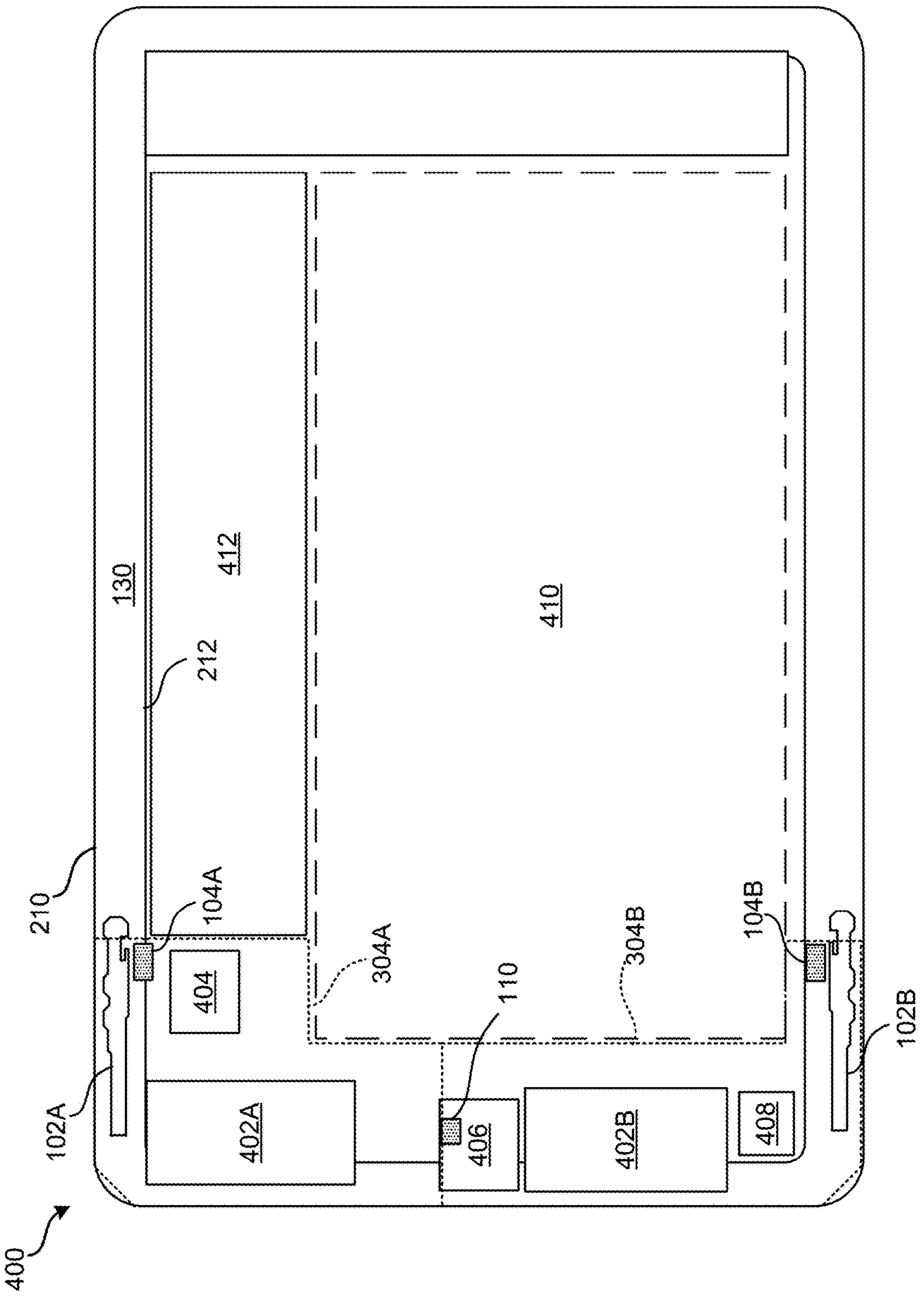
FIG. 4 illustrates a view that shows different components located within the enclosure of the electronic device.

FIG. 4 illustrates a view 400 that shows different components located within the enclosure of the electronic device. FIG. 4 is similar to FIG. 3 but includes a view of different components within cavity area 304A and 304B, as well as different components that are outside of the cavity areas.

In some examples, a speaker element 402A and one or more other components 404 may be placed within cavity area 304A and a speaker element 402B and one or more other components 408 may be placed within cavity area 304B. In other examples, other types of components may be placed within one or more of the cavity areas.

Depending on the placement of these different components, the locations of the antennas 102, as well as the grounding foams 104 may be positioned differently than illustrated within the current examples.

Figure 5:
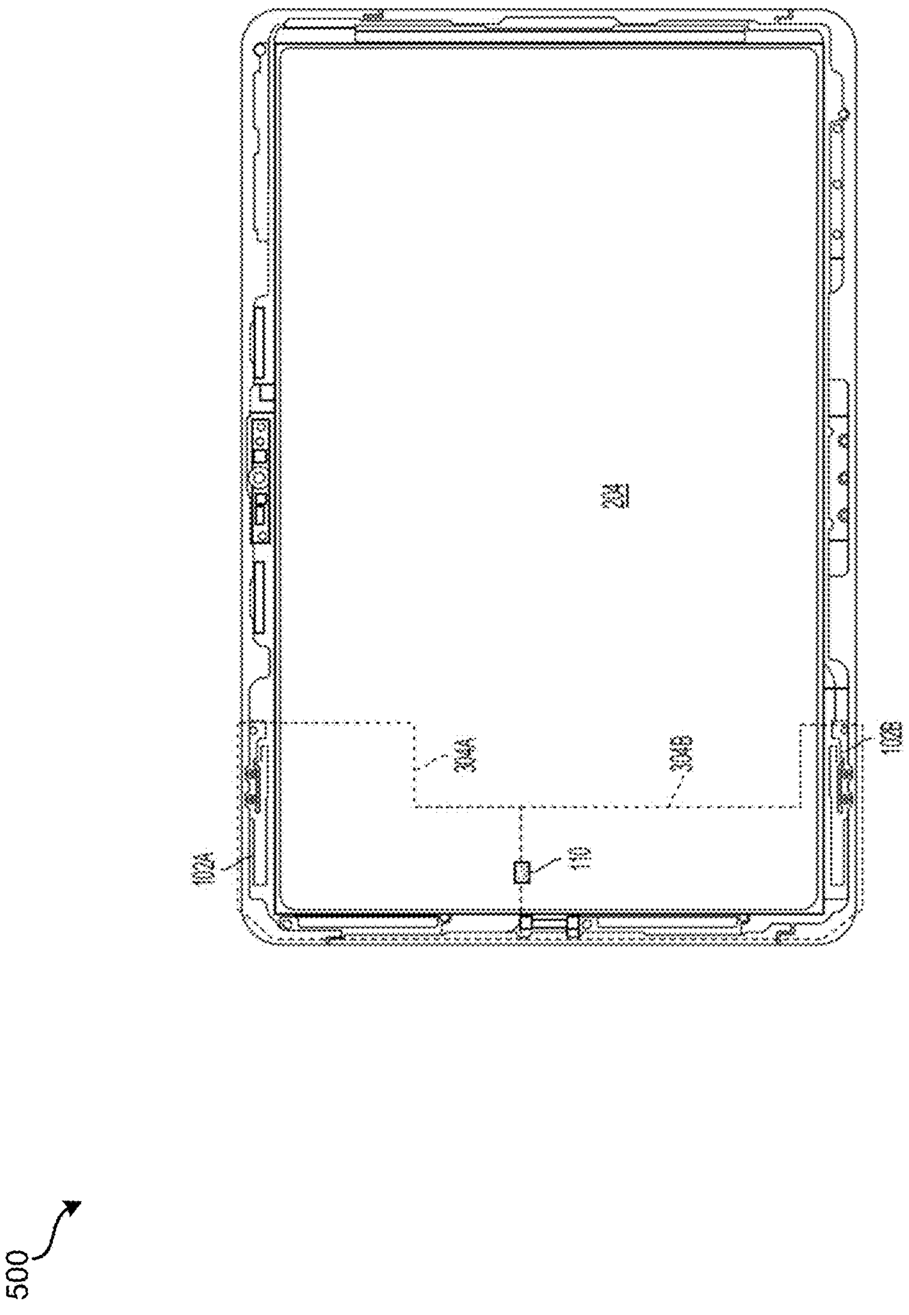
FIG. 5 shows a top view of an electronic device, without the bezel, in which a display is placed over the two cavity areas.

FIG. 5 shows a top view 500 of an electronic device 120, without the bezel 130, in which a display 204 is placed over the two cavity areas. As can be seen, the display 204 covers the decoupling element 110, and the grounding foams 104A and 104B. In the current example, the location of the first antenna 102A and the second antenna 102B are located outside of the area of the display 204 and are located under the bezel.

Figure 6:
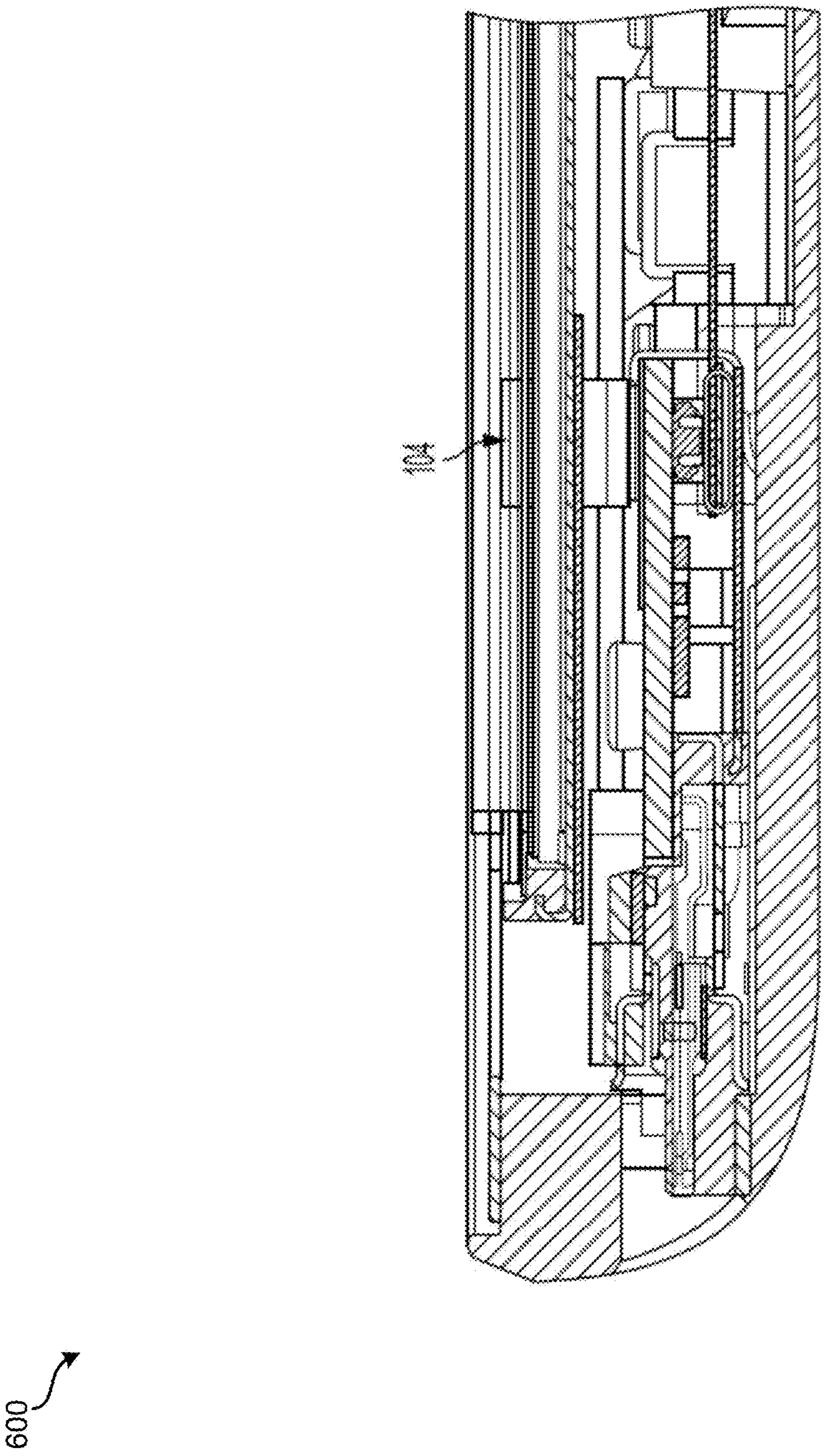
FIG. 6 shows a sectional view of the electronic device of FIG. 3, taken along section line 10-10 that includes display grounding foam in a compressed state.

FIG. 6 shows a sectional view of the electronic device of FIG. 3, taken along section line 10-10, that includes display grounding foam in a compressed state. As can be seen by referring to FIG. 6, the grounding foam 104 is illustrated in a compressed state.

Figure 7:
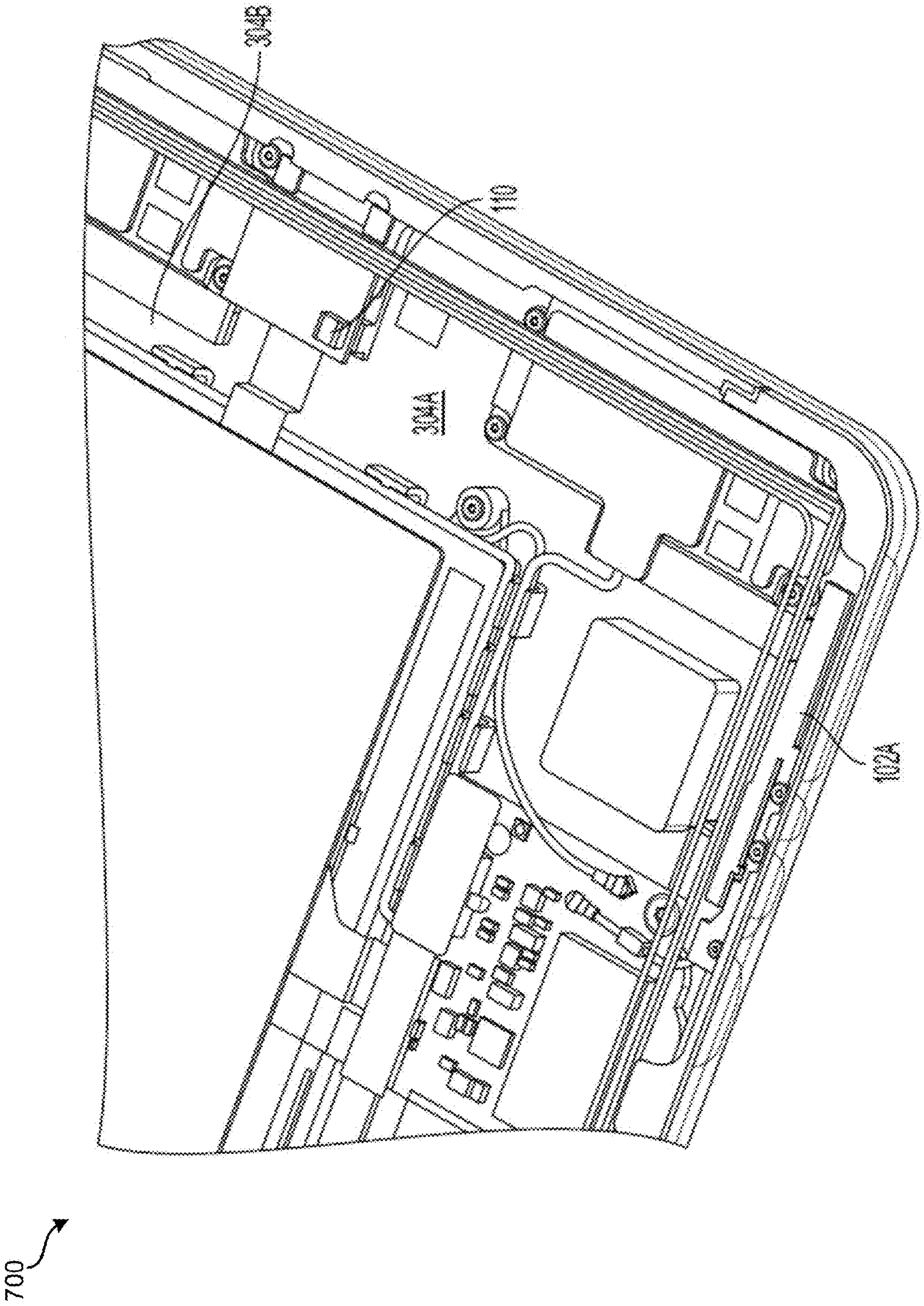
FIG. 7 illustrates a top view of the electronic device of FIG. 4 that shows a location of an antenna and decoupling element within the electronic device.

FIG. 7 illustrates a top view of the electronic device of FIG. 4 that shows a location of an antenna 102A and a decoupling element 110 within the electronic device. FIG. 7 shows additional components located within the enclosure of the electronic device. As can be seen, cavity area 304A and cavity area 304B are created by the placement of decoupling element 110.

Figure 8:
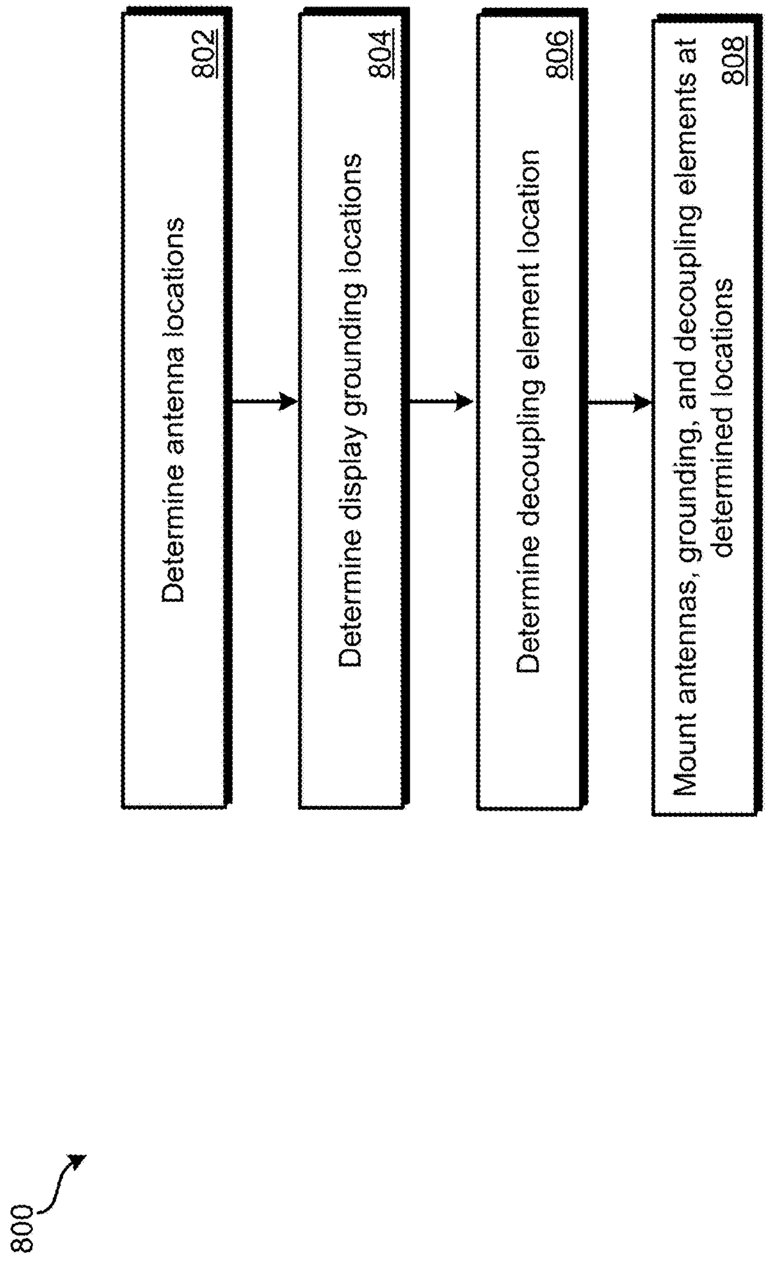
FIG. 8 illustrates a method that may be used to incorporate antennas within a device having a narrow display bezel.

Various methods may be performed using the systems, states, and arrangements detailed in relation to FIGS. 1-7. FIG. 8 illustrates a method 800 that may be used to incorporate antennas 102 within a device having a narrow display bezel 130.

At 802, the location of antennas within an electronic device are determined. As discussed above, in some examples, the electronic device 120 has a metal enclosure that does not include an antenna window and has a narrow display bezel. The antennas 102 are configured to emit radiation from the enclosure. In some examples, antennas 102 are antennas that can operate at one or more bands (e.g., 2.4 GHz, 5 GHZ, 6 GHz bands). As discussed above, a decoupling element 110 is used to improve the efficiency of the antennas 102 included within the device. The location of the antennas 102 can also be based on other constraints, such as but not limited to physical constraints of the electronic device 120.

At 804, the display grounding locations are determined. As discussed above, grounding foam 104 may be positioned to improve the efficiency of an antenna at one or more frequency bands (e.g., 2.4 GHz, 5 GHZ, 6 GHZ, and the like). In some cases, a first grounding foam 104A is positioned adjacent to a first antenna 102, and a second grounding foam 104B is positioned adjacent to a second antenna 102B. In some examples, a determination is made to identify the location near the antenna(s) where the current associated with a particular frequency band is the strongest. For example, a determination using testing and/or simulating of an antenna can be made to determine a location of the ground to increase the efficiency of antenna 102 at or near the desired frequency or frequencies. The location of the grounding foam 104, or some other grounding element such as a spring or screw, can also be based on other constraints, such as but not limited to physical constraints of the electronic device 120.

At 806, a location of one or more decoupling elements 110 is determined. As discussed above, the decoupling element 110 is directed at increasing the efficiency of the antennas 102 when they pare placed in proximity to each other. According to some examples, a decoupling element 110, such as but not limited to decoupling foam, is placed such that the two different cavity areas 304A and 304B are formed from a single cavity area (the area that includes cavity area 304A and cavity area 304B) such that the first antenna 102A is isolated from the second antenna 102B.

At 808, the antennas 102, grounding foam 104, and decoupling element 110 are mounted at the determined locations. As discussed above, the antennas 102 may be positioned underneath the bezel of the display, and the grounding foam 104 may be placed underneath the display near the antenna and the bezel. In some examples, the decoupling element 110 is located between the antennas.

Figure 9:
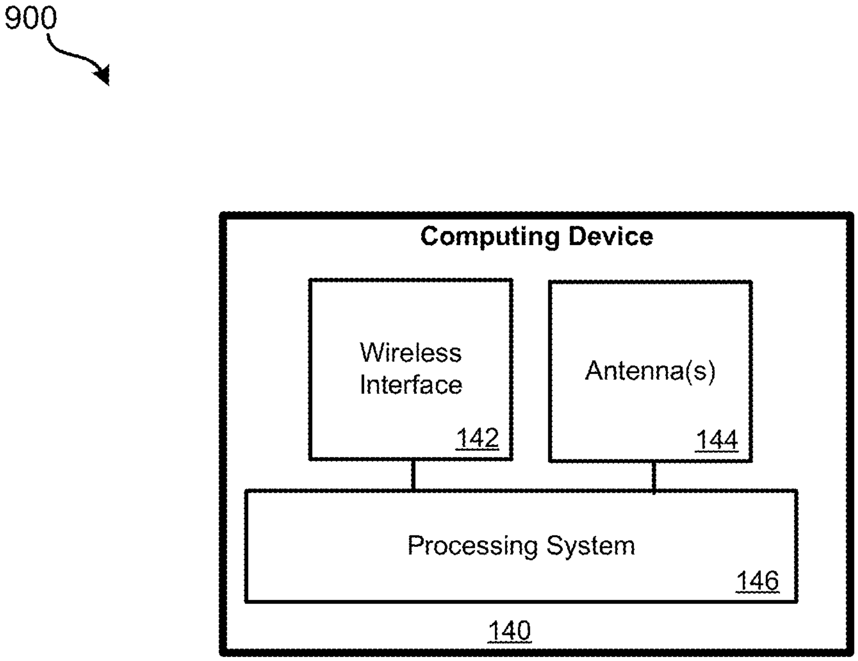
FIG. 9 shows some components of an electronic computing device, such as a tablet.

FIG. 9 shows some components of an electronic computing device 140, such as a tablet. Specifically, device 140 include: wireless interfaces 142; antenna(s) 144, and processing system 146. As illustrated in different drawings, the device 140 may have many other components, such as but not limited to microphones, speakers, a metal enclosure, a display, a bezel, and the like.

Computing device 140 includes wireless interface 142 and processing system 146. Examples of computing device 140 can include: a smartphone; a desktop, laptop, or tablet computer; a gaming device; a smart television; a digital music player device; a smartwatch; smart glasses; an augmented reality or a virtual reality headset; or any other device. Computing device 140 includes wireless interface 142, which can wirelessly communicate with other devices, using one or more types of communication protocols. Processing system 146 may include one or more special-purpose or general-purpose processors. Such special-purpose processors may include processors that are specifically designed to perform the functions of the components detailed herein, such as detailed in relation to processing systems 126.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An electronic device, comprising:

an enclosure, comprising a first cavity area, a second cavity area, and a dividing area, wherein the dividing area separates the first cavity area and the second cavity area;

a display mounted on top of the enclosure;

a first antenna mounted within the first cavity area of the enclosure, wherein the first antenna operates at one or more first frequency bands;

a second antenna mounted within the second cavity area of the enclosure, wherein the second antenna operates at one or more second frequency bands;

a decoupling element mounted within the dividing area of the enclosure that the decoupling element, at least partially, isolates the first antenna from the second antenna, wherein:

a first length of the decoupling element is less than a second length of the dividing area; and one or more grounding elements, wherein the grounding elements are positioned to ground the display and are positioned within the enclosure based, at least in part, on at a first location of the first antenna, or a second location of the second antenna.

2. The electronic device of claim 1, wherein the enclosure is a metal enclosure that is absent of an antenna window.

3. The electronic device of claim 1, wherein the first antenna and the second antenna are mounted beneath a display bezel.

4. The electronic device of claim 3, wherein the display bezel is less than 10 mm wide, and wherein the first antenna is mounted near a first corner of the enclosure and the second antenna is mounted near a second corner of the enclosure.

5. The electronic device of claim 1, wherein the one or more grounding elements are further positioned based on a determination of a first strength of a first current of the first antenna at the first location within the electronic device and a second strength of a second current of the second antenna at the second location within the electronic device.

6. The electronic device of claim 1, wherein the one or more grounding elements comprise one or more of a fabric over foams (FoF), a spring, or a screw.

7. The electronic device of claim 1, wherein the decoupling element is positioned beneath the display and between the first antenna and the second antenna based, at least in part, on one or more antenna isolation measurements.

8. The electronic device of claim 1, wherein the first antenna and the second antenna are slot antennas.

9. A system, comprising:

an electronic device that includes a metal enclosure, comprising a cavity area including a first cavity area, a second cavity area, and a dividing area that separates the first cavity area and the second cavity area;

a display mounted on the metal enclosure of the electronic device;

a first antenna mounted within the first cavity area of the electronic device, wherein the first antenna operates at one or more of a 2.4 GHz frequency band and a 5 GHz frequency band;

a second antenna mounted within the second cavity area of the electronic device, wherein the second antenna operates at one or more of a 2.4 GHz frequency band and a 5 GHZ frequency band;

a decoupling element mounted within the dividing area such that the decoupling element, at least partially, isolates the first antenna from the second antenna, and a first length of the decoupling element is less than a second length of the dividing area; and one or more grounding elements, wherein the grounding elements are positioned to ground the display and are positioned within the enclosure based, at least in part, on at a first location of the first antenna, or a second location of the second antenna.

10. The system of claim 9, wherein the enclosure is absent of an antenna window.

11. The system of claim 9, further comprising a display bezel that is less than 10 mm wide, and wherein the first antenna and the second antenna are mounted beneath the display bezel.

12. The system of claim 9, wherein the one or more grounding elements are further positioned based on a determination of a first strength of a first current of the first antenna at the first location within the electronic device and a second strength of a second current of the second antenna at the second location within the electronic device.

13. The system of claim 9, wherein the one or more grounding elements comprise one or more of a fabric over foams (FoF), a spring, or a screw.

14. The system of claim 9, wherein the decoupling element is positioned beneath the display and between the first antenna and the second antenna based, at least in part, on one or more antenna isolation measurements.

15. The system of claim 9, wherein the first antenna and the second antenna are slot antennas.

16. A method for incorporating antennas within an electronic device, comprising:

determining a first location in a first cavity area to mount a first antenna within an enclosure of the electronic device;

determining a second location in a second cavity area to mount a second antenna within the enclosure, wherein the first cavity area and the second cavity area are separated by a dividing area;

determining a third location in the dividing area to mount a decoupling element within the enclosure, wherein the decoupling element at least partially isolates the first antenna from the second antenna, and a first length of the decoupling element is less than a second length of the dividing area;

determining grounding locations to mount one or more grounding elements within the enclosure, based at least in part on the first location of the first antenna and the second location of the second antenna; and mounting the first antenna, the second antenna, the decoupling element, and the one or more grounding elements within the enclosure.

17. The method of claim 16, wherein determining the grounding locations is further based on a determination of a first strength of a first current of the first antenna at the first location within the electronic device and a second strength of a second current of the second antenna at the second location within the electronic device.

* * * * *